US007014108B2

(12) United States Patent
Sorenson et al.

(10) Patent No.: US 7,014,108 B2
(45) Date of Patent: Mar. 21, 2006

(54) METHODS AND APPARATUSES FOR PURCHASING TELEPHONE CALLING CARD MINUTES USING AN ELECTRONIC COMMERCE KIOSK AND FOR CONDUCTING OTHER FORMS OF ELECTRONIC COMMERCE

(75) Inventors: Timothy N. Sorenson, Bradenton, FL (US); Michael J. Boyle, Sarasota, FL (US)

(73) Assignee: Coinstar E-Payment Services Inc., Bellevue, WA (US)

( * ) Notice: Subject to any disclaimer, the term of this patent is extended or adjusted under 35 U.S.C. 154(b) by 102 days.

(21) Appl. No.: 10/414,826

(22) Filed: Apr. 15, 2003

(65) Prior Publication Data

US 2004/0031847 A1 Feb. 19, 2004

Related U.S. Application Data

(60) Provisional application No. 60/372,844, filed on Apr. 16, 2002.

(51) Int. Cl.
*G06F 7/08* (2006.01)
(52) U.S. Cl. .................................... 235/381
(58) Field of Classification Search ........ 235/379–381, 235/383, 384; 705/16
See application file for complete search history.

(56) References Cited

U.S. PATENT DOCUMENTS

| | | | | |
|---|---|---|---|---|
| 4,677,565 A | * | 6/1987 | Ogaki et al. ................ | 700/234 |
| 5,350,906 A | | 9/1994 | Brody et al. | |
| 5,365,046 A | | 11/1994 | Haymann | |
| 5,409,092 A | * | 4/1995 | Itako et al. ................. | 194/210 |
| 5,457,305 A | | 10/1995 | Akel et al. | |
| 5,531,640 A | | 7/1996 | Inoue | |
| 5,555,497 A | | 9/1996 | Helbling | |
| 5,564,546 A | | 10/1996 | Molbak et al. | |
| 5,577,959 A | | 11/1996 | Takemoto et al. | |
| 5,620,079 A | * | 4/1997 | Molbak ....................... | 194/217 |
| 5,637,845 A | | 6/1997 | Kolls | |
| 5,652,421 A | * | 7/1997 | Veeneman et al. .......... | 235/381 |
| 5,665,952 A | | 9/1997 | Ziarno | |
| 5,696,908 A | * | 12/1997 | Muehlberger et al. ........ | 705/39 |
| 5,699,328 A | | 12/1997 | Ishizaki et al. | |
| 5,732,398 A | * | 3/1998 | Tagawa ......................... | 705/5 |
| 5,743,429 A | | 4/1998 | Morofsky | |
| 5,746,299 A | | 5/1998 | Molbak et al. | |

(Continued)

FOREIGN PATENT DOCUMENTS

DE 3147603 A1 6/1983

(Continued)

OTHER PUBLICATIONS

Sheehan, Michael, "Marriage of Convenience," 3 pages http://www.kioskbusiness.com/NovDec01/articles/article4.html [accessed 05/16/2003].

(Continued)

*Primary Examiner*—Uyen-Chau N. Le
(74) *Attorney, Agent, or Firm*—Perkins Coie LLP

(57) ABSTRACT

Methods and apparatuses for purchasing telephone calling card minutes and for conducting other forms of electronic commerce. In one embodiment, a method for conducting electronic commerce includes providing a kiosk in a publicly accessible location, and displaying one or more transaction options to a user at the kiosk. The method may further include receiving a transaction selection from the user corresponding to one or more of the displayed transaction options, determining an amount due from the user in response to the transaction selection, and receiving funds from the user. In response to receiving the funds, the kiosk may dispense a redeemable voucher to the user, including a redeemable voucher for any amount paid in excess of the amount due.

27 Claims, 6 Drawing Sheets

U.S. PATENT DOCUMENTS

| | | | |
|---|---|---|---|
| 5,799,767 A | 9/1998 | Molbak | |
| 5,839,956 A | 11/1998 | Takemoto | |
| 5,868,236 A * | 2/1999 | Rademacher | 194/217 |
| 5,974,146 A | 10/1999 | Randle et al. | |
| 6,105,009 A | 8/2000 | Cuervo | |
| 6,116,402 A | 9/2000 | Beach et al. | |
| 6,119,099 A * | 9/2000 | Walker et al. | 705/16 |
| 6,138,106 A | 10/2000 | Walker et al. | |
| 6,144,946 A | 11/2000 | Iwamura | |
| 6,185,545 B1 | 2/2001 | Resnick et al. | |
| 6,230,928 B1 | 5/2001 | Hanna et al. | |
| 6,233,564 B1 | 5/2001 | Schulze, Jr. | |
| 6,289,324 B1 | 9/2001 | Kawan | |
| 6,318,536 B1 * | 11/2001 | Korman et al. | 194/217 |
| 6,405,182 B1 | 6/2002 | Cuervo | |
| 6,415,262 B1 | 7/2002 | Walker et al. | |
| 6,494,776 B1 | 12/2002 | Molbak | |
| 6,505,774 B1 * | 1/2003 | Fulcher et al. | 235/381 |
| 6,554,184 B1 | 4/2003 | Amos | |
| 2002/0026423 A1 | 2/2002 | Maritzen et al. | |

FOREIGN PATENT DOCUMENTS

| | | |
|---|---|---|
| EP | 0313294 A2 | 4/1989 |
| EP | 0857579 A2 | 8/1998 |
| EP | 1178448 A2 | 2/2002 |
| GB | 2188467 A | 9/1987 |
| JP | 3-63795 A | 3/1991 |
| WO | WO 99/50785 A1 | 10/1999 |

OTHER PUBLICATIONS

International Search Report, International Application No. PCT/US98/22534, dated Jan. 26, 1999.

International Search Report, International Application No. PCT/US03/11648, dated Nov. 10, 2003, 4 pages.

International Search Report, International Application No. PCT/US03/04603, dated Oct. 6, 2003, 4 pages.

International Search Report, International Application No. PCT/US03/04601, dated Aug. 19, 2003.

International Search Report, International Application No. PCT/US03/04799, dated Jul. 4, 2003.

International Search Report, International Application No. PCT/US03/04600, dated Jun. 23, 2003.

* cited by examiner

METHODS AND APPARATUSES FOR PURCHASING TELEPHONE CALLING CARD MINUTES USING AN ELECTRONIC COMMERCE KIOSK AND FOR CONDUCTING OTHER FORMS OF ELECTRONIC COMMERCE

CROSS-REFERENCE TO RELATED APPLICATION(S)

This patent application is related to and claims the benefit of U.S. Provisional Application No. Ser. 60/372,844, entitled "METHOD FOR ACCESSING AND PROCESSING MULTIPLE TRANSACTIONS FROM A TERMINAL," filed on Apr. 16, 2002, which is incorporated herein in its entirety by reference.

This patent application also incorporates in its entirety by reference PCT Application PCT/US 03/04600, entitled "METHODS AND SYSTEMS FOR EXCHANGING AND/OR TRANSFERRING VARIOUS FORMS OF VALUE," filed on Feb. 14, 2003.

BACKGROUND

Electronic commerce is typically conducted through the use of personal computers. Forms of electronic commerce ("e-commerce") include buying and selling products, paying bills, viewing account summaries and transactions, and online investing. E-commerce may also be conducted using other devices. Examples of such other devices include personal digital assistants, web-enabled cellular telephones, and interactive television receivers.

Participation in e-commerce often requires payment by credit card. Some people do not have a credit card because of poor credit, lack of credit history, personal choice, or other reasons. In fact, there are many individuals who do not even have a bank account. Such individuals may be unable to participate in e-commerce, despite their desire to do so. As another example, participating in e-commerce often requires an investment in a personal computer, a personal digital assistant with Internet access, a web-enabled cellular telephone, an interactive television receiver (where available), or other device with Internet connectivity. For some people, such investments are financially out of reach.

As e-commerce transactions become more widespread, people unable to participate in e-commerce may be disadvantaged. While some people have access to Internet terminals at work, in public libraries, in Internet cafes, or elsewhere, these terminals may not be available for participating in e-commerce because of policies restricting such use. Some people may also be uncomfortable conducting some transactions, though legal, at work or in a library because of concerns that their employer or others may be tracking their use and transactions. As an example, employers may track which web sites employees visit, or may block access to some web sites altogether. There may also be security concerns when using credit card numbers at a library terminal.

Figure 1:
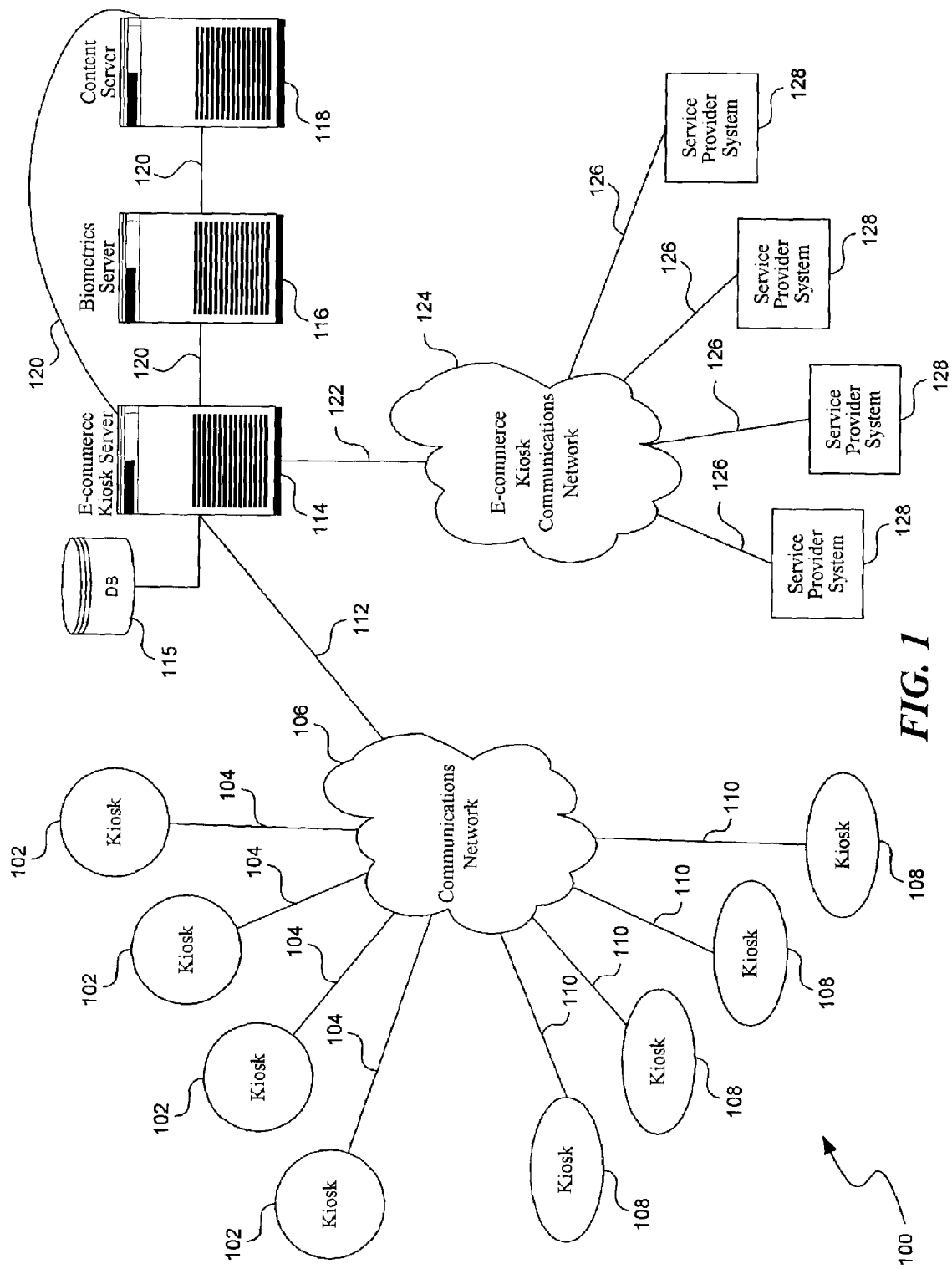
FIG. 1 illustrates a network topology view showing network connections in accordance with an embodiment.

In the drawings, identical reference numbers identify identical or substantially similar elements or acts. To easily identify the discussion of any particular element or act, the most significant digit or digits in a reference number refer to the Figure number in which that element is first introduced and discussed (e.g., element 102 is first introduced and discussed with respect to FIG. 1).

Note: The headings provided herein are for convenience and do not necessarily affect the scope or interpretation of the invention.

DETAILED DESCRIPTION

An embodiment of the invention described below enables one to participate in e-commerce without using a personal computer or one of the other devices discussed above, and instead enables participation through use of an e-commerce kiosk. In particular, the embodiment described may be used by a customer to purchase minutes on prepaid long-distance telephone calling cards. As an example, in return for cash, credit, or other currency provided by a customer, the kiosk may dispense a voucher that includes a telephone number and unique identification number. Using this unique identification number and voucher, the customer can telephone the indicated telephone number to activate access to a long-distance calling network.

Other uses for an e-commerce kiosk in this and other embodiments include selling prepaid credit cards and debit cards, adding minutes to prepaid long distance telephone calling cards, and adding or purchasing minutes for use with prepaid cellular telephone services. As a further example, a customer may deposit cash toward a prepaid debit card the customer already possesses. The debit card may or may not be associated with a bank account.

Such an e-commerce kiosk may also be used by a customer, for example, to pay bills. As an example, a customer may provide cash or other currency to be applied towards payment of a telephone bill.

While some embodiments of e-commerce kiosks may be able to accept payments with cash as well as credit cards or debit cards, other embodiments may be able to accept only cash. Further, some e-commerce kiosks that accept cash may be incapable of returning money or change to the customer. As an example, if a transaction requires a payment of $8, and the customer provides a $10 bill, the e-commerce kiosk may be incapable of returning $2 in physical monetary currency (hereinafter, "currency") as change. Reasons why an e-commerce kiosk may be incapable of returning change include lacking hardware to do so or having an insufficient amount of required denominations of currency. In these situations, the e-commerce kiosk may instead return change to the customer in the form of a voucher.

An e-commerce kiosk may be a "network client" as known in the relevant art and may execute software independent of or in conjunction with an e-commerce kiosk server. The e-commerce kiosk client software may be capable of being executed on devices such as personal computers, handheld devices, Internet terminals, cellular telephones, and point-of-sale terminals. These devices, including the e-commerce kiosk, may be coupled to a variety of input and output devices. Examples of such devices include display screens, printers, cameras, keypads, media dispensers, card readers, monetary currency input regions, touch screens, and digital pens.

FIG. 1 illustrates a network topology 100 configured in accordance with an embodiment. In one aspect of this embodiment, several e-commerce kiosks 102 may be coupled via communications links 104 to a communications network 106. Several other e-commerce kiosks 108 may be connected via communications links 110 to the communications network 106. While two forms of e-commerce kiosks are shown in this Figure, several embodiments are anticipated. Examples of embodiments of e-commerce kiosks include various forms of vending machines, automated teller machines, advanced pay telephones, and other retail automated machines. Also coupled to the communications network 106 via a communications link 112 may be an e-commerce kiosk server 114. Transactions selected by customers at the e-commerce kiosks 102 or 108 may be routed to the e-commerce kiosk server 114.

In another aspect of this embodiment, the e-commerce kiosk server 114 may be coupled to a database 115. The database 115 may be stored on the same or another e-commerce kiosk server 114, or may reside in a separate server (not shown). One familiar with the relevant art will understand how software executing on an e-commerce kiosk server 114 will be able to retrieve data stored in the database 115, whether that database 115 is stored in the same or separate servers. The database 115 may store information including unique identifiers that have been provided to customers relating to vouchers, a personal identification number associated with each unique identifier, a telephone number for the customer to call for activation of the purchased products, a credit amount, an indication of whether the voucher identified has already been used, and other pertinent information relating to providing e-commerce services on an e-commerce kiosk 102 or 108.

In yet another aspect of this embodiment, the e-commerce kiosk server 114 may be coupled via a communications link 120 to a biometrics server 116 and a content server 118. The biometrics server 116 conducts various fraud detection and prevention activities, including prevention of fraudulent check cashing. The content server 118 may perform various activities, including storing user interface content and advertising for use on the e-commerce kiosks 102 and 108. One familiar with the relevant art will understand how content stored on the content server 118 is transferred via various communications links and protocols to e-commerce kiosks 102 and 108 for rendering the content. The content stored on a content server 118 may include images, Extensible Markup Language ("XML") documents, hypertext markup language ("HTML") documents, and instructions to enable an e-commerce kiosk 102 or 108 to render the documents correctly. As an example, advertising and other content specifically targeted to consumer demographics on a kiosk or time-of-day basis may be rendered on e-commerce kiosks 102 and 108 after retrieval from the content server 118. An e-commerce kiosk 102 located in a department store may display different advertisements than an e-commerce kiosk 108 located at a convenience store. Additionally, an e-commerce kiosk 102 located in a department store may show different advertisements during weekdays than during evenings and weekends to target different demographics. Further, an e-commerce kiosk 102 located in a sporting goods department may show different advertisements than an e-commerce kiosk 102 located in an electronics department. E-commerce kiosks may be located in many locations including shopping centers, street sidewalks, gas stations, grocery stores, and restaurants in addition to department and convenience stores.

The e-commerce kiosk server 114 may also be coupled via a communications link 122 to an e-commerce kiosk communications network 124. Multiple service provider systems 128 may also be coupled to the e-commerce kiosk communications network 124 via communications links 126. Examples of service provider systems 128 include systems operated by telephone long distance companies, cellular telephone companies, bankcard companies, and aggregators of services from service providers. These various service provider systems 128 may operate independently on different computer systems and may use different communications protocols. The e-commerce kiosk server 114 may be able to exchange information with multiple service provider systems 128 independently or jointly and in parallel or sequentially despite using the same or different communications protocols or system software.

A possible use scenario of the embodiment described in FIG. 1 is as follows. A customer elects to purchase minutes toward his or her long-distance telephone calling card at an e-commerce kiosk 102. The customer is prompted by the e-commerce kiosk to select a service provider and to deposit $10. The customer deposits a $10 bill in the e-commerce kiosk in response to the prompt after selecting a service provider. The e-commerce kiosk 102 uses the communications network 106 to communicate with the e-commerce kiosk server 114 to notify the provider of long-distance services selected by the customer that the customer has deposited money towards minutes on his or her prepaid calling card. The e-commerce kiosk server 114 uses the e-commerce kiosk communications network 124 to communicate with the service provider system 128 of the long-distance provider selected by the customer. The service provider may return information including a unique identifier and, in one embodiment, a telephone number, for use by the customer to the e-commerce kiosk server 114 via the e-commerce kiosk communications network 124. The e-commerce kiosk server 114, in turn, provides some of that information including the unique identifier and telephone number to the customer via the e-commerce kiosk 102. The customer is then able to use that unique identifier and telephone number to activate the purchased minutes on his or her long distance calling card.

In another use scenario, the customer does not need to activate the purchased minutes. Instead, the activation occurs automatically when the minutes are purchased by the customer. This automatic activation may or may not require input from the customer. In yet another embodiment, no activation may be required at all.

In the embodiment described in FIG. 1, a mechanism is available to update audiovisual or other user interface content or other aspects of the e-commerce kiosks 102 and 108. As an example, when content needs to be updated, the content only needs to be updated at the content server 118. The e-commerce kiosks 102 and 108 retrieve the updated content via the communications network 106 from the content server 118. As described above, the content used by an e-commerce kiosk 102 may be the same or different than content used by other e-commerce kiosks 108 or even another e-commerce kiosk 102.

Figure 2:
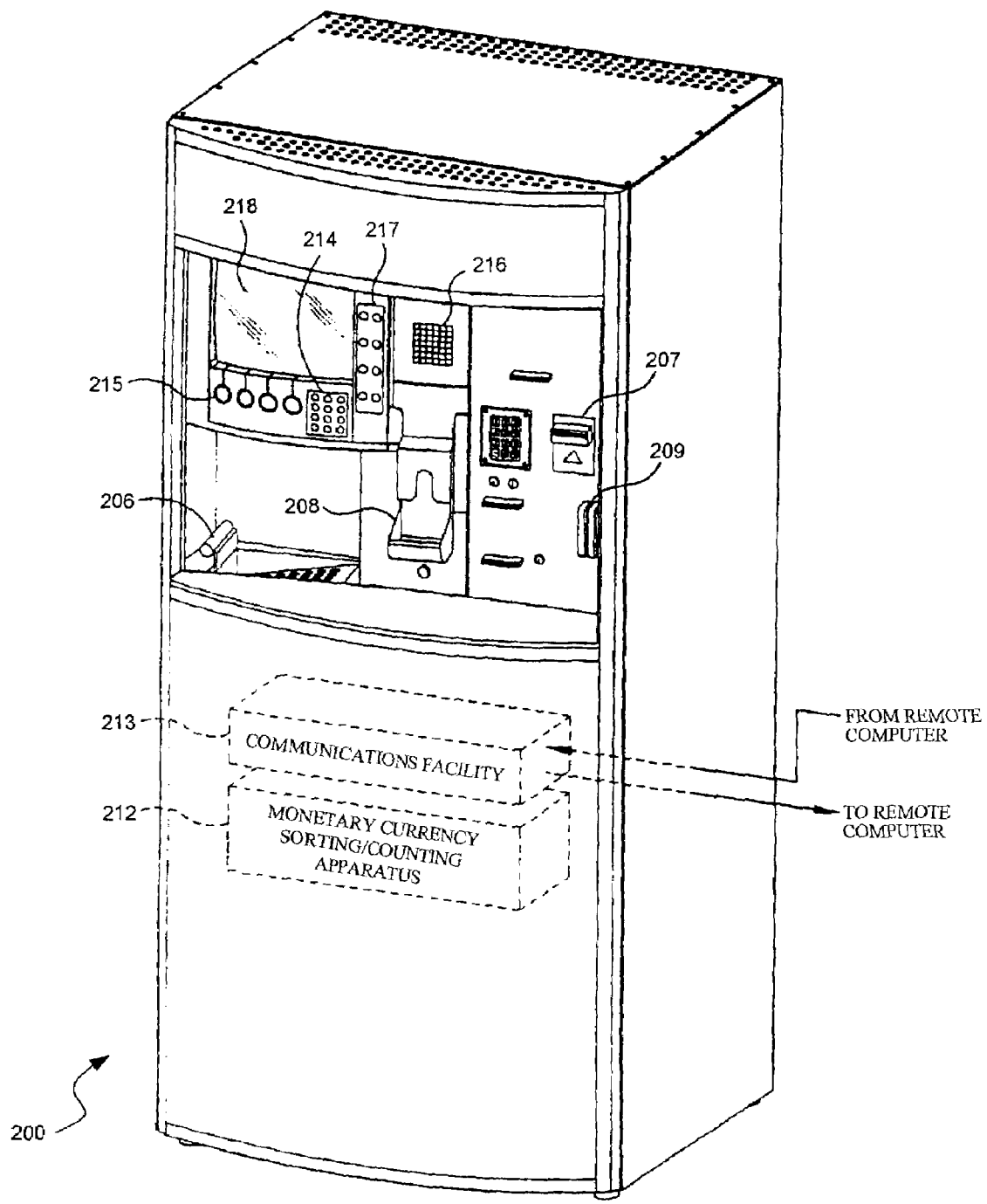
FIG. 2 illustrates a partially schematic front isometric view of an e-commerce kiosk configured in accordance with an embodiment.

FIG. 2 illustrates a partially schematic front isometric view of an e-commerce kiosk 200 configured in accordance with an embodiment. In one aspect of this embodiment, the e-commerce kiosk 200 may include a currency input region or tray 206, bill and voucher acceptor 207, voucher outlet 208, card reader 209, currency sorting/counting apparatus 212 (shown schematically), and communications facility 213 (also shown schematically). The couplings from and to a remote computer may be a single coupling to a communications network. The e-commerce kiosk 200 may further include various user interface devices, such as a keypad 214, user selection buttons 215, speaker 216, soft keys 217, and display screen 218 which may be touch-enabled. The keypad 214, user selection buttons 215, soft-keys 217, and touch-enabled display screen 218 may be used to enable quick and easy access to various features and functions of the e-commerce kiosk 200. The display screen 218 may display information in color, monochrome, or "gray-scale," and may be used to display elements of a user interface, advertisements, or other information. The e-commerce kiosk 200 may accept various forms of payment, including cash, credit cards, debit cards, chip cards, and magnetic striped cards.

In one embodiment of the e-commerce kiosk 200, a telephone handset may be included (not shown) to enable a customer to communicate with advertisers, providers of products sold in the e-commerce kiosk, and to access assistance in using the e-commerce kiosk 200. The e-commerce kiosk may also include a digital camera for use during check cashing and other financial services.

Figure 3:
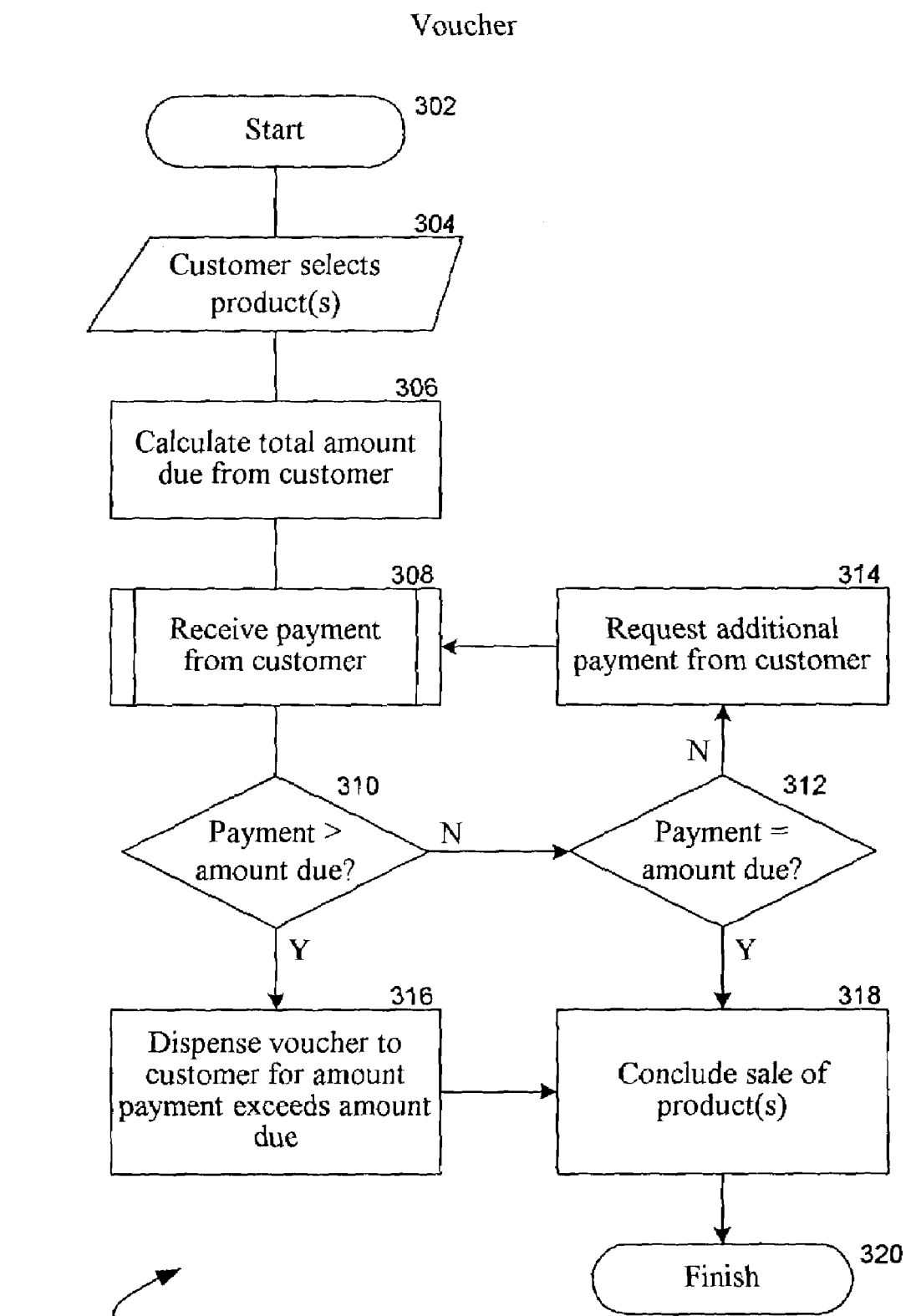
FIG. 3 illustrates a flow diagram of a Voucher routine in accordance with an embodiment of an e-commerce kiosk, such as the kiosk illustrated in FIG. 2.

FIG. 3 is a flow diagram illustrating a Voucher routine 300 in accordance with an embodiment of an e-commerce kiosk, such as the kiosk 200 illustrated in FIG. 2. The routine 300 starts at block 302. At block 304, a customer selects one or more products. Examples of products may include payment of bills, addition of money to prepaid bank cards or credit cards, and purchase of prepaid wireless telephone services, prepaid Internet access, prepaid residential telephone services, and long-distance telephone calling cards. Other products an e-commerce kiosk can offer may include financial services such as check cashing, purchase of money orders, and wire transfers of funds.

At block 306, the routine 300 determines a total amount of money due from the customer. After presentation of the total amount due, the routine waits until payment is received from the customer. Acceptable forms of payment may include bills, coins, credit or debit cards, or vouchers dispensed by the e-commerce kiosk incidental to a prior transaction. However, this routine 300 is particularly useful when the e-commerce kiosk receives bills or coins and is unable to make change. At block 308, the routine 300 receives payment from the customer. Block 308 is further described below as subroutine 600 in reference to FIG. 6. At block 310, the routine 300 determines if the amount of payment provided by the customer exceeds the amount of money due from the customer.

If, at block 310, the amount received from the customer exceeds the amount due from the customer, the routine 300 then dispenses a voucher to the customer at block 316 for the amount of the payment exceeding the amount due. The routine 300 then continues at block 318 to conclude the sale of the products.

If, at block 310, the amount received from the customer does not exceed the amount due from the customer, then, at block 312, the routine 300 determines whether the amount of money received from the customer is equal to the amount of money due from the customer. If that is the case, the routine 300 concludes the sale of the products at block 318 and ends at block 320. If the amount received from the customer is less than the amount due from the customer, the routine 300 continues at block 314 by requesting an additional payment from the customer, and jumps to block 308 to receive the additional payment. Concluding the sale of the products may include dispensing a voucher other than the voucher described above for returning change to the customer. The routine 300 then ends at block 320.

In an alternate embodiment, the voucher routine 300 may execute block 318 before block 316 when the branch condition at block 310 is true.

In a further aspect of this embodiment, a voucher is credit that can be used at an e-commerce kiosk toward a future transaction. A code may be printed on the voucher enabling the customer to uniquely identify the voucher during such a transaction. Vouchers may also be redeemed via mail. In addition, some forms of e-commerce kiosks may be capable of returning cash in exchange for a voucher. In various other embodiments, vouchers may be issued by an e-commerce kiosk in lieu of cash when a transaction is canceled by the customer after payment, when the customer has paid more than the transaction amount, or when the e-commerce kiosk experiences various forms of errors. A voucher may also be issued by an e-commerce kiosk that is unable to provide change upon excess payment by the customer as a result of not having appropriate denominations of currency.

Figure 4:
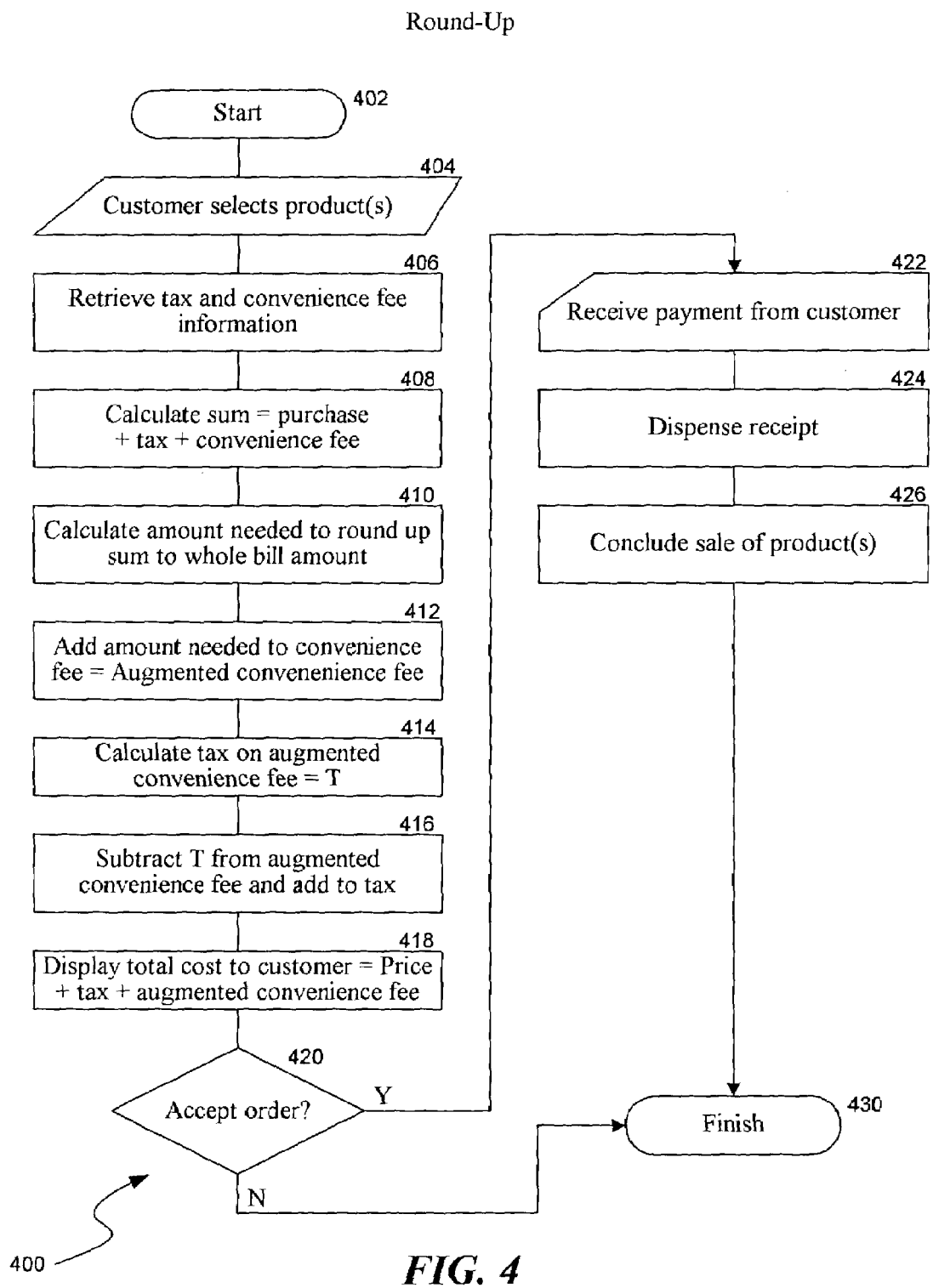
FIG. 4 illustrates a flow diagram of a Round-Up routine in accordance with an embodiment of an e-commerce kiosk, such as the kiosk illustrated in FIG. 2.

FIG. 4 is a flow diagram illustrating a Round-Up routine 400 in accordance with an embodiment of an e-commerce kiosk, such as the kiosk 200 illustrated in FIG. 2. The routine 400 starts at block 402. At block 404, a customer selects one or more products with an associated price. The products of block 404 may include one or more of the same products described above with reference to block 304 of FIG. 3.

At block 406, the routine 400 retrieves tax and convenience fee information based on the type and price of the selected products. In one embodiment, the routine 400 retrieves this information from a back office server. In another embodiment, the routine 400 retrieves this information from the same computer system that the routine 400 is executing on. In yet another embodiment, the routine 400 retrieves this information from a third party. At block 408, the routine 400 calculates a sum that is equal to the price of the products selected at block 404, plus a tax amount on this total, and plus a convenience fee.

At block 410, the routine 400 determines an amount needed to round up the sum calculated at block 408 to a whole bill amount. A whole bill amount is an amount that can be paid using one or more denominations of a form of physical monetary currency. Examples of whole bill amounts in the United States may include $1, $2, $5, $10, $20, $50, and $100. Examples of total amounts that are not whole bill amounts may include $2.50, $35.27, and $0.65. At block 412, the routine 400 adds the amount determined at block 410 to the convenience fee retrieved at block 406 to determine an augmented convenience fee. At block 414, the routine 400 determines a tax on the augmented convenience fee determined at block 412. At block 416, the routine 400 subtracts the tax determined at block 414 from the augmented convenience fee determined at block 412, and adds that tax amount to the total tax determined at block 406. At block 418, the routine 400 displays the total amount due from the customer.

The customer then has an opportunity at block 420 to accept or reject the order. If the customer accepts the order, the routine 400 continues at block 422, where it receives payment from the customer. At block 424, the routine 400 dispenses a receipt showing the products purchased, the applicable convenience fees, the taxes, and the total amount paid. At block 426, the routine 400 concludes the sale of the selected products. Concluding the sale of the products may include dispensing a voucher other than the voucher described above for returning change to the customer. The routine 400 then ends at block 430. If the customer rejects the order at block 420, the routine 400 ends at block 430.

In one embodiment, only a single bill of physical currency may be deposited by the customer. In yet another embodiment, multiple bills and denominations may be deposited. In another embodiment, the e-commerce kiosk may provide the customer with a list of other products that may be added to the current selection of products to minimize the convenience fee used to round up the amount due to a whole bill amount.

Figure 5:
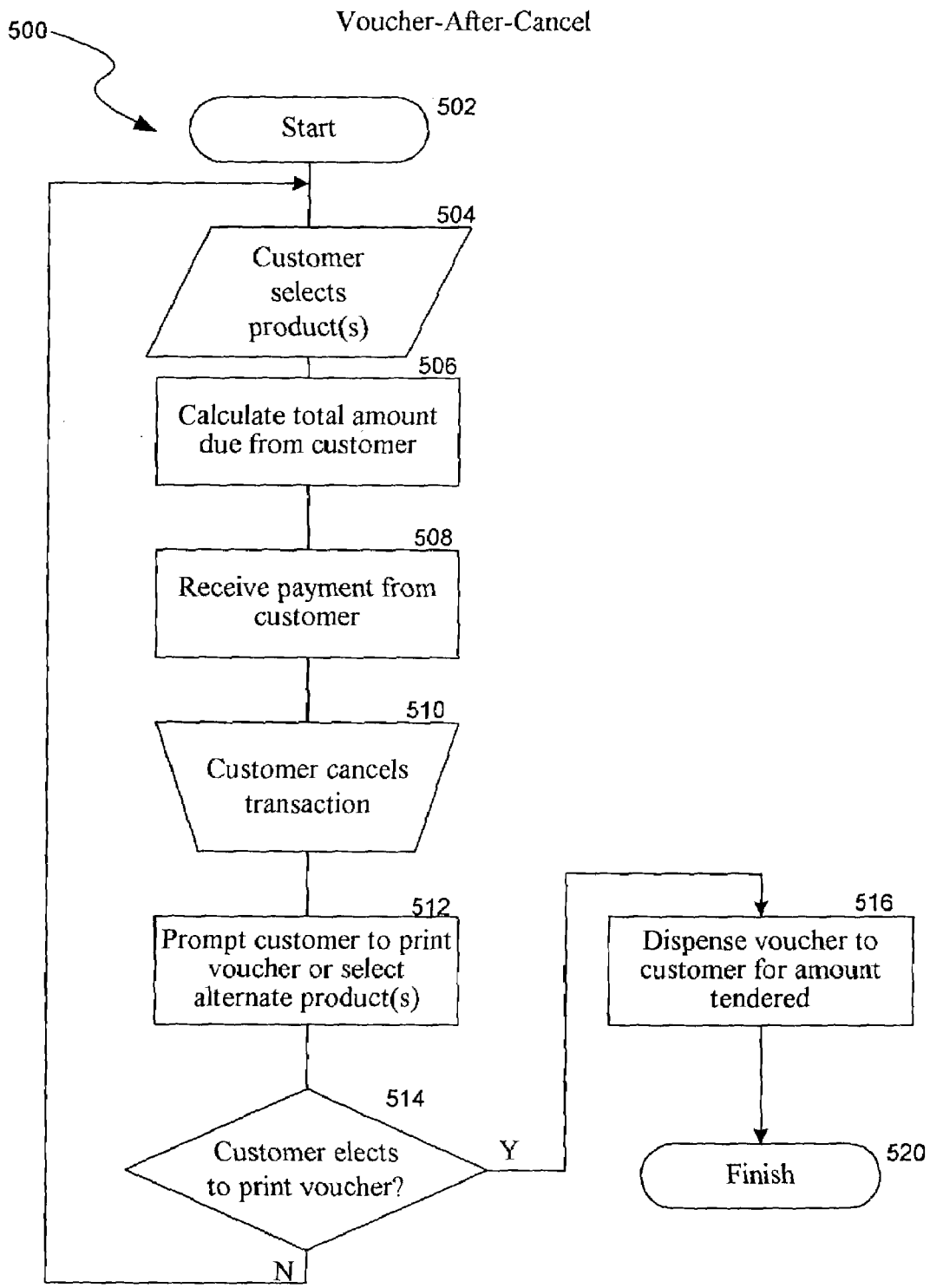
FIG. 5 illustrates a flow diagram of a Voucher-After-Cancel routine in accordance with an embodiment of an e-commerce kiosk, such as the kiosk illustrated in FIG. 2.

FIG. 5 is a flow diagram illustrating a Voucher-After-Cancel routine 500 in accordance with an embodiment of an e-commerce kiosk, such as the kiosk 200 illustrated in FIG. 2. The routine 500 starts at block 502. At block 504, a customer selects one or more products. The products of block 504 may include one or more of the same products described above with reference to block 304 of FIG. 3. At block 506, the routine 500 determines a total amount of money due from the customer for the selected products. Acceptable forms of payment are described above for block 306. After presentation of the amount due, the routine 500 waits until payment is received from the customer. Once payment is received, the routine 500 continues at block 508.

At block 510, the customer cancels the pending transaction after tendering payment. The routine 500 then prompts the customer at block 512 to print a voucher for the amount tendered or select alternate products. If at block 514 the customer elects to select alternate products, the routine 500 continues at block 504. If the customer elects to print a voucher at block 514, then the routine 500 dispenses a voucher to the customer at block 516 for the amount tendered at block 508. The routine 500 then ends at block 520. If the customer makes no selection in response to the prompt of block 512, any amount tendered by the customer is available for the next customer of the e-commerce kiosk 200. The voucher dispensed at block 508 may be used by the customer in a manner similar to that described above for the voucher dispensed at block 316.

Figure 6:
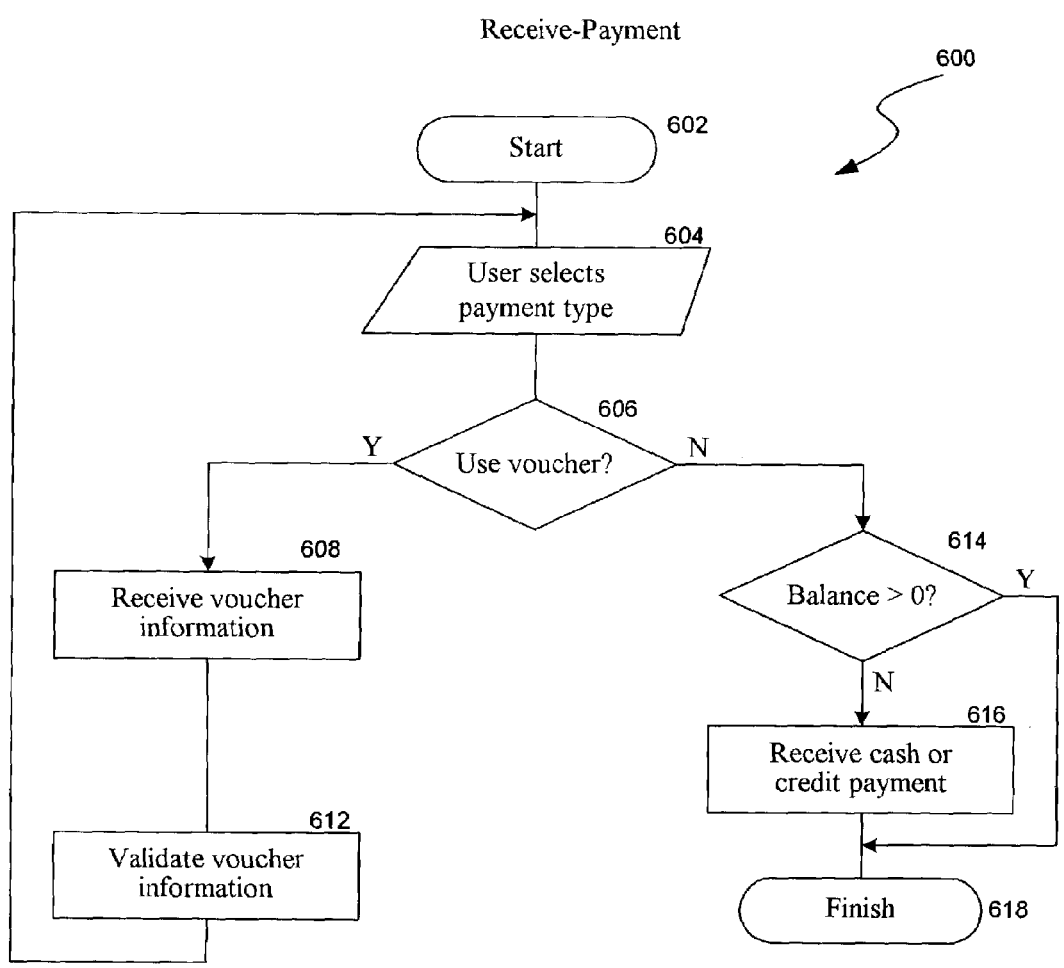
FIG. 6 illustrates a flow diagram of a Receive-Payment routine in accordance with an embodiment of an e-commerce kiosk, such as the kiosk illustrated in FIG. 2.

FIG. 6 is a flow diagram illustrating a Receive-Payment subroutine 600 in accordance with an embodiment of an e-commerce kiosk, such as the kiosk 200 illustrated in FIG. 2. The subroutine 600 starts at block 602. At block 604, a customer selects a payment type. Payment types include cash, credit card, debit card, and vouchers. At block 606, the subroutine determines whether the customer elected to include one or more vouchers as payment. If the customer indicated that a voucher would be used for payment, the subroutine continues at block 608 where the subroutine receives information related to the voucher used for payment.

In one embodiment, at block 608, the customer is prompted for a unique identifier previously provided with the voucher. In one aspect of this embodiment, the subroutine prompts the customer for a personal identification number ("PIN") associated with the unique identifier provided at block 608. In another aspect of this embodiment, the PIN may be various other indicia that reliably authenticate the voucher.

In another embodiment, the subroutine may receive information relating to the voucher from a barcode previously printed on the voucher.

At block 612, the subroutine validates the received information relating to the voucher. In one embodiment, the information received is transmitted to an e-commerce kiosk server 114 illustrated in FIG. 1 for validation. The e-commerce kiosk server 114 determines whether the received information is valid by retrieving information related to the voucher from the database 115 illustrated in FIG. 1. As an example, the subroutine may receive an indication from the e-commerce kiosk server 114 on whether the voucher for which information was received has already been used. Reasons for making this determination include detecting fraud and preventing erroneous transactions. The subroutine then continues at block 604 and the customer can then make additional payments toward purchase.

If, at block 606, the customer elects not to use a voucher, then the subroutine determines whether vouchers were used for payment at block 614, in which case the balance would exceed zero. If the balance exceeds zero, the subroutine finishes at block 618. Alternatively, if the balance does not exceed zero at block 614, the subroutine requests the customer to make payments using cash, credit card, debit card, or other non-voucher forms of payment acceptable by an e-commerce kiosk.

In another embodiment, if the customer elects not to use a voucher at block 606, the subroutine ends at block 618. In yet another embodiment, the customer is not prompted to select a payment type at block 604. Instead, the subroutine skips block 604 and prompts the customer to use vouchers at block 606. In such an embodiment, the subroutine also continues at block 606 from block 612.

Several examples of products that an e-commerce kiosk may offer for sale are discussed above. These products may be made available to the customer by dispensing a voucher. Printed on the voucher may be information relating to how the customer may access the products purchased. As an example, the voucher may include a toll-free telephone number and unique identifier.

In one embodiment of the e-commerce kiosk, all user interface-related content and instructions are served from a server. In so doing, one familiar with the relevant art will understand that features and functions may thus be dynamically updated to meet customer needs and incorporate new technological breakthroughs. One familiar with the relevant art will also understand that "dynamically updating" content involves updating content on a server that will be retrieved by a client automatically.

As described above, an e-commerce kiosk may be a stand-alone unit or may be embodied in various other devices such as an automated teller machine. In such a way, a retailer may either choose to install a stand-alone unit or integrate an e-commerce kiosk with some other form of retail machine already in use. As an example, an e-commerce kiosk may be integrated with a vending machine. Another example of an e-commerce kiosk is a countertop module. In such a configuration, a customer selects products to purchase and, optionally, pays using a credit card. If the customer desires to pay by cash, the customer may then pay a retail clerk or cashier.

As described above, an e-commerce kiosk 200 may be a client to an e-commerce kiosk server 114. One familiar with the relevant art will understand how network communications between clients and servers are performed, including the use of various security measures to promote a secure and robust communications environment. One familiar with the relevant art will also understand that the communications networks 106 and 124 may be public networks, private networks, or a combination of both. The communications networks 106 and 124 may or may not share the same communications lines.

One familiar with the relevant art will also understand that the technology described above is not specific to any given hardware configuration, communications protocol, or other systems applications.

Unless the context clearly requires otherwise, throughout the description and the claims, the words "comprise," "comprising," and the like are to be construed in an inclusive as opposed to exclusive or exhaustive sense; that is to say, in a sense of "including, but not limited to." Words using the singular or plural number also include the plural or singular number, respectively. The words "herein," "above," "below," and words of similar import, when used in this application, shall refer to this application as a whole and not to any particular portion of this application.

The above detailed descriptions of embodiments of this invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or blocks are presented in a given order, alternative embodiments may perform routines having steps or blocks in a different order. The various embodiments described herein can be combined to provide further embodiments. These and other changes can be made to the invention in light of the detailed description.

In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method for use by an electronic commerce kiosk for selling prepaid telephone service, the method comprising:
   providing an electronic commerce kiosk in a publicly accessible location;
   displaying one or more purchase options to a user at the kiosk corresponding to one or more types of telephone usage;
   receiving a purchase selection from the user at the kiosk corresponding to at least one of the displayed purchase options;
   determining an amount due from the user in response to receiving the purchase selection;
   receiving a plurality of randomly oriented coins substantially simultaneously in a coin input region of the kiosk to at least partially pay for the selected purchase;
   subtracting the amount due from a sum of the received coins to determine a difference;
   when the difference is greater than zero, automatically dispensing a voucher to the user at the kiosk in the absence of dispensing monetary currency to the user, wherein the voucher is at least redeemable for additional purchases selected at the kiosk;
   when the user desires to cancel the purchase selection after receiving the coins, receiving a user input indicating that the user wishes to cancel the purchase selection; and
   in response to receiving the user input canceling the purchase selection, dispensing a voucher to the user, wherein the voucher is redeemable for a value related to the sum of the received coins.

2. The method of claim 1, wherein dispensing the voucher to the user includes automatically dispensing a voucher to the user in the absence of receiving a user input at the kiosk requesting the voucher.

3. The method of claim 1, further comprising receiving additional funds including paper currency from the user.

4. The method of claim 1, further comprising receiving additional funds by reading a magnetic card provided by the user at the kiosk.

5. The method of claim 1, further comprising receiving a first voucher from the user at the kiosk to at least partially pay for the selected transaction, and wherein dispensing the voucher to the user at the kiosk includes dispensing a second voucher to the user.

6. A method for conducting electronic commerce, the method comprising:
   providing an electronic commerce kiosk in a publicly accessible location;
   displaying one or more transaction options to a user at the kiosk;
   receiving a transaction selection from the user at the kiosk corresponding to at least one of the displayed transaction options;
   determining an amount due from the user in response to receiving the transaction selection;
   receiving a plurality of randomly oriented coins substantially simultaneously in a coin input region of the kiosk to at least partially pay for the selected transaction;
   subtracting the amount due from a sum of the received coins to determine a difference;
   when the difference is greater than zero, dispensing a voucher to the user at the kiosk in the absence of dispensing monetary currency to the user, wherein the voucher is redeemable for a value at least generally corresponding to the difference between the funds received and the amount due;
   when the user desires to cancel the transaction selection after receiving the coins, receiving a user input indicating that the user wishes to cancel the transaction selection; and
   in response to receiving the user input canceling the transaction selection, dispensing a voucher to the user, wherein the voucher is redeemable for a value related to the sum of the received coins.

7. The method of claim 6, wherein dispensing the voucher to the user includes automatically dispensing a voucher to the user in the absence of receiving a user input at the kiosk requesting the voucher.

8. The method of claim 6, further comprising receiving additional funds comprising paper currency from the user.

9. The method of claim 6, further comprising receiving additional funds by reading a magnetic card provided by the user at the kiosk.

10. The method of claim 6, further comprising receiving a first voucher from the user at the kiosk to at least partially pay for the selected transaction, and wherein dispensing the voucher to the user at the kiosk includes dispensing a second voucher to the user.

11. The method of claim 6 wherein dispensing the voucher to the user includes dispensing a voucher that is redeemable at the kiosk by the user for another transaction.

12. The method of claim 6 wherein the transaction selection is a first transaction selection, wherein the amount due from the user is a first amount due, wherein the funds received from the user are first funds, wherein the voucher is a first voucher, and wherein the method further comprises:
receiving a second transaction selection from the user at the kiosk;
determining a second amount due from the user in response to receiving the second transaction selection;
receiving second funds from the user at the kiosk to at least partially pay for the second selected transaction, the second funds including the first voucher;
subtracting the second amount due from the second funds received to determine a difference; and
when the difference is greater than zero, dispensing monetary currency to the user at the kiosk.

13. The method of claim 6 wherein:
receiving a transaction selection from the user includes receiving an indication that the user wishes to purchase telephone usage time for an amount due equivalent to a first monetary amount;
receiving coins from the user includes receiving funds equivalent to a second monetary amount, the second monetary amount being greater than the first monetary amount; and
dispensing the voucher to the user includes dispensing a voucher redeemable for a value at least generally equivalent to the difference between the first and second monetary amounts.

14. The method of claim 6 wherein:
receiving a transaction selection from the user includes receiving a first transaction selection indicating that the user wishes to purchase telephone usage time for an amount due equivalent to a first monetary amount;
receiving coins from the user includes receiving funds equivalent to a second monetary amount, the second monetary amount being greater than the first monetary amount;
dispensing a voucher to the user includes dispensing a first voucher redeemable for a value at least generally equivalent to a difference between the first and second monetary amounts, the difference between the first and secondary monetary amounts calculated by subtracting the first monetary amount from the second monetary amount; and wherein the method further comprises:
receiving a second transaction selection from the user at the kiosk indicating that the user wishes to purchase additional telephone usage time; and
receiving the first voucher from the user at the kiosk to at least partially pay for the second selected transaction.

15. A method in an electronic commerce kiosk for providing a voucher to a user, the method comprising:
calculating a total amount due from the user for a selected transaction;
receiving a plurality of randomly oriented coins substantially simultaneously as payment from the user for the transaction;
determining whether the payment received exceeds the amount due;
when the payment received exceeds the amount due, dispensing a voucher to the user, wherein the voucher is redeemable for an amount the received payment exceeds the amount due;
when the user desires to cancel the transaction after receiving the coins, receiving a user input indicating that the user wishes to cancel the transaction; and
in response to receiving the user input canceling the transaction, dispensing a voucher to the user, wherein the voucher is redeemable for an amount at least generally equivalent to the payment received from the user.

16. An apparatus for selling telephone service time in a publicly accessible location, the apparatus comprising:
an input region configured to receive a plurality of randomly oriented coins substantially simultaneously;
a monetary currency discriminator configured to receive monetary currency from the input region; and
a voucher dispenser in the absence of a monetary currency output region, the voucher dispenser configured to dispense a redeemable voucher at least partially in response to receiving user input to cancel a transaction after receiving monetary currency in the input region.

17. The apparatus of claim 16, further comprising a magnetic card reader.

18. The apparatus of claim 16 wherein the kiosk is coupled to a server computing device through a communications network.

19. The apparatus of claim 18 wherein the communications network is a private communications network.

20. The apparatus of claim 18 wherein the communications network is a public communications network.

21. A system for conducting electronic commerce in a publicly accessible location, the system comprising:
means for displaying one or more transaction options to a user at a kiosk;
means for receiving a transaction selection from the user at the kiosk corresponding to at least one of the displayed transaction options;
means for determining an amount due from the user in response to receiving the transaction selection;
means for receiving a plurality of randomly oriented coins substantially simultaneously to at least partially pay for the selected transaction;
means for subtracting the amount due from a sum of the received coins to determine a difference;
when the difference is greater than zero, means for dispensing a voucher to the user at the kiosk in the absence of dispensing monetary currency to the user, wherein the voucher is redeemable for a value at least generally corresponding to the difference between the funds received and the amount due;
when the user desires to cancel the selected transaction after receiving the coins, means for receiving a user input indicating that the user wishes to cancel the selected transaction, and in response to receiving the user input canceling the selected transaction, dispensing a voucher to the user, wherein the voucher is redeemable for an amount at least generally equivalent to the payment received from the user.

22. The system of claim 21, wherein the means for dispensing a voucher to the user includes means for automatically dispensing a voucher to the user in the absence of receiving a user input at the kiosk requesting the voucher.

23. The system of claim 21 wherein the means for receiving coins from the user includes means for receiving additional funds including paper currency from the user.

24. The system of claim 21 wherein the means for receiving coins from the user further includes means for receiving a first voucher from the user at the kiosk to at least partially pay for the selected transaction, and wherein the means for dispensing a voucher to the user at the kiosk includes means for dispensing a second voucher to the user.

25. The system of claim 21 wherein the means for dispensing a voucher to the user includes means for dispensing a voucher that is redeemable at the kiosk by the user for another transaction.

26. The method of claim 21 wherein the transaction selection is a first transaction selection, wherein the amount due from the user is a first amount due, wherein the coins received from the user are first funds, wherein the voucher is a first voucher, and wherein the system further comprises:
   means for receiving a second transaction selection from the user at the kiosk;
   means for determining a second amount due from the user in response to receiving the second transaction selection;
   means for receiving second funds from the user at the kiosk to at least partially pay for the second selected transaction, the second funds including the first voucher;
   means for subtracting the second funds received from the second amount due to determine a difference; and
   when the difference is greater than zero, means for dispensing monetary currency to the user at the kiosk.

27. The method of claim 21 wherein:
   the means for receiving a transaction selection from the user includes means for receiving a first transaction selection indicating that the user wishes to purchase telephone usage time for an amount due equivalent to a first dollar amount;
   the means for receiving coins from the user further includes means for receiving funds equivalent to a second dollar amount, the second dollar amount being greater than the first dollar amount;
   the means for dispensing a voucher to the user includes means for dispensing a first voucher redeemable for a value at least generally equivalent to the difference between the first and second dollar amounts; and wherein the system further comprises:
   means for receiving a second transaction selection from the user at the kiosk indicating that the user wishes to purchase additional telephone usage time; and
   means for receiving the first voucher from the user at the kiosk to at least partially pay for the second selected transaction.

\* \* \* \* \*